United States Patent [19]

Warren

[11] Patent Number: 5,055,313
[45] Date of Patent: Oct. 8, 1991

[54] FOOD PRESERVATIVE COMPOSITIONS

[75] Inventor: Beth Z. Warren, Maryland Heights, Mo.

[73] Assignee: Monsanto Company, St. Louis, Mo.

[21] Appl. No.: 602,547

[22] Filed: Oct. 24, 1990

Related U.S. Application Data

[60] Division of Ser. No. 378,111, Jul. 3, 1989, Pat. No. 4,988,522, which is a continuation of Ser. No. 118,132, Nov. 9, 1987, abandoned.

[51] Int. Cl.$^5$ .............................................. A23B 00/00
[52] U.S. Cl. ..................................... 426/268; 426/74; 426/271; 426/541
[58] Field of Search ............... 426/268, 270, 331, 335, 426/104, 271, 532, 541, 615, 74

[56] References Cited

U.S. PATENT DOCUMENTS

| | | | |
|---|---|---|---|
| 2,874,059 | 2/1959 | Powers et al. | 426/629 |
| 3,497,362 | 2/1970 | Paton et al. | 99/204 |
| 3,895,119 | 7/1975 | Grom | 426/267 |
| 4,011,348 | 3/1977 | Farrier et al. | 426/268 |
| 4,097,612 | 6/1978 | Powrie et al. | 426/269 |
| 4,818,549 | 4/1989 | Steiner et al. | 426/267 |

OTHER PUBLICATIONS

Farmer Brothers, "Sulfite-Free Sta-White", Sta-White Product Bulletin (1984), pp. 1–39E.
DePoix et al, "Combined Effects of Chlorides and Ascorbic Acid on Inhibition of Crushed Apples Enzymatic Browning", Chemical Abst., 93:44292w.
Pfizer, "Pfizer CE101 P for Potatoes", Pfizer Chemical Division Products Division (1986).
Chemical Marketing Reporter, Jun. 29, 1987, p. 24, AGRA Research, Inc. Product Bulletin.
Insta Merse Anti-Oxidant Product Bulletin, Pfizer Chemical Division Product Bulletin.
Food Engineering, Oct. 1986, "Accidulants Find Growth Niches in Mature Market", pp. 83–88.
Fresh Way Product Bulletin.
Salad Fresh Product Bulletin.
"Study of the Inhibition of Enzymic Browning by Chlorides", DePoix, Rouet-Mayer, Bull. Liaison--Groupe Polyphenols (9), 1980.
"Combined Effects of Chlorides and Ascorbic Acid on Inhibition of Crushed Apples Enzymic Brownings", DePoix, Rouet-Mayer, Philippon, Lebensm.-Wiss. Technol., 13(2), 105–10, 1980.
Processing and Distribution Alternatives for Minimal Processed Fruit and Vegetables, Charles C. Huxsalt & Harold R. Bolin, Food Technology, Feb. 1989.

*Primary Examiner*—R. B. Penland
*Attorney, Agent, or Firm*—R. C. Loyer; R. H. Shear; J. C. Bolding

[57] ABSTRACT

Compositions and process are disclosed for treating freshly cut surfaces of edible plant parts by dipping the freshly cut parts in an aqueous solution containing edible ingredients which simultaneously protects the plant parts from degradation and coloration by oxidative, enzymatic, microbial and metal ion effects.

11 Claims, No Drawings

FOOD PRESERVATIVE COMPOSITIONS

This is a DIVISION of Application Ser. No. 07/378,111, filed July 3, 1989 now U.S. Pat. No. 4,988,522 which is a continuation of Application Ser. No. 118,132 filed Nov. 9, 1987, now abandoned.

BACKGROUND OF THE INVENTION

This invention relates to novel compositions which are adapted as food preservatives. More particularly, this invention relates to compositions and a process for preserving freshly cut plant parts for long periods of time without appreciable degradation, loss of flavor and without fear of discoloration.

It has long been known that sulfiting agents including sulfur dioxide, sodium sulfite, sodium and potassium bisulfite and sodium and potassium metabisulfite possess the ability to preserve vegetable food products, particularly in the restaurant industry. Sulfites have also been employed as preservatives in prepared foods such as flavored beverages, syrup concentrates, wine and vinegar as well as in the processing of sugar, corn starch and shrimp. Because of the recent increase in reported allergic reactions to these compounds, their use has fallen into disfavor. Regulatory actions involving the use of sulfites have been initiated and the former status of "generally recognized as safe" GRAS use of sulfites on raw foods and vegetables has been withdrawn by the U.S. Government Food and Drug Administration. Further labeling requirements have been imposed by the Food and Drug Administration on packaged food containing direct or indirect additions of sulfites.

There has not been known previously any single GRAS approved chemical that can replace sulfites in any given application, much less across the range of all applications. Food degradation from various sources are recognized in the literature and individual chemicals are known which will inhibit one aspect or another of degradation derived from a single source. Degradation, loss of color or flavor of freshly cut plant parts are known to be caused by oxidation, enzymes, microbes, and metal ions. For example, acidulants are known to prevent microbial degradation by maintaining a relatively low pH environment but their effectiveness has been only temporary.

There is currently a great need for a composition which would replace sulfite treatment yet obtain the multiple preservative and antioxidant actions that sulfites provide. While no single agent has been found numerous attempts at combinations of agents have failed to provide storage stable freshly cut plant parts safe from degradation by the several different sources of degradation to which cut plant parts are so vulnerable.

SUMMARY OF THE INVENTION

The present invention provides compositions useful in the treatment of raw, cut plant parts to improve their quality and storage stability against the effects of oxidation, thermo-oxidation, enzymatic, microbial and metal ion attack. Such compositions have been found to be an effective replacement for sulfite treatment. The present compositions provide in a single, simple dipping process, preservative action against the above-mentioned elements which result in degradation thereby extending the time during which the cut plant parts are capable of being stored without degradation or discoloration.

Compositions of this invention include an antioxidant, an enzyme inhibitor, an acidulant and a unique metal ion sequestrant which is compatible with the acidulant.

DETAILED DESCRIPTION OF THE INVENTION

There has been found unique combinations of agents each compatible with the other and soluble in water which provides a simple, effective dipping process whereby cut plant parts can be treated by contacting the plant parts with the aqueous solution containing the below-described components. Further, there has been found particular blends of these components which are effective to provide freshly cut plant parts with a pleasing and fresh appearance as well as favorable storage stable properties.

In the following description of the present invention all percentages given are understood to be percent by weight unless otherwise stated. Further, the components of the food preservative of this invention are usually prepared by mixing the various components such as by blending them in the dry state mechanically. Of course, other means for blending the various components may be employed and the components may be blended together by adding them independently to an aqueous medium thereby providing the inventive blend of ingredients in aqueous solution.

The antioxidant component of the compositions of this invention comprises, preferably, ascorbic acid. In many instances such as when the freshly cut plant parts are to be consumed within about 24 hours of cutting, the food preservative composition of this invention comprises only from about 8 to about 12 percent ascorbic acid or any antioxidant equivalent thereof. However, when longer storage times are desired larger amounts such as up to about 20% of the composition comprises ascorbic acid. The larger amount of antioxidant in the composition of this invention protects the plant parts against temperature accelerated oxidative processes. Ascorbic acid has been found to be the most effective and convenient antioxidant in the compositions of this invention because it is most compatible with the other ingredients. However, the sterioisomer of ascorbic acid, erythorbic acid may also be employed.

Some plant parts are rapidly decomposed after cutting through enzymatic action, particularly potatoes, apples, pears, green peppers, and mushrooms. It has been found that a chloride ion source in the preservative compositions of this invention greatly inhibits such enzymatic action and the incorporation of an inorganic chloride ion source results in surprising storage stability of the cut plant parts. The chloride ion source is typically a non-toxic alkali metal or alkaline earth metal chloride such as calcium chloride. As with other components of the inventive preservative compositions now claimed the chloride ion source is preferably highly water soluble at room temperature, in the amounts employed in the compositions and process herein disclosed. Thus, calcium chloride is preferred but other salts such as sodium chloride, potassium chloride, magnesium chloride may also be employed to provide the chloride ion in solutions into which the plant parts are dipped in accordance with this invention. The chloride ion source usually comprises about 25% to about 40% of the preservative composition and is typically in the range of about 25% to about 35%. As with other components of the compositions of this invention, adjustments in the amount of each ingredient may occur depending upon the plant part treated and the amount of storage time of the cut plant parts expected.

The third component of the preservative compositions of this invention comprises an antimicrobial agent in the form of an acidulant. The acidulant desirably maintains the treating solutions into which the cut plant parts are immersed at a relatively low pH so that microbial growth is inhibited. In general, the acidulant will maintain the treating solution pH of between about 2 and 3. More particularly, the usual pH of the treating solutions of this invention are in the range of about 2.5 to about 3. Typical acidulants include edible acids such as fumaric acid, citric acid, and erythorbic acid. Such acids are particulate materials at ordinary temperatures and are therefore preferred. Other acids may be employed at lower pH of the treating solution. In compositions of this invention citric acid is preferred because of its water solubility.

Another important ingredient of the preservative compositions of this invention is a metal ion sequestrant. While it has been known to be important to sequester metal ions in fruit and vegetable preservation schemes, the compositions of this invention provide cut plant parts with particularly effective preservation because of the incorporation therein of an acidic polyphosphate metal ion chelant or sequestrant. In particular, it is desirable to incorporate an alkali metal acid polyphosphate and more particularly a sodium acid polyphosphate. Because they are strongly active at the required low pH levels for microbial growth inhibition and is safe at relatively high levels of concentration, such polyphosphates are uniquely suited in compositions of this invention to provide cut plant parts extraordinarily long storage ability. While any alkali metal acid polyphosphate may be employed it has been found preferable to employ sodium acid pyrophosphate (SAPP). Potassium pyrophosphate may also be employed but is not as generally available as SAPP.

Acidic polyphosphates useful in compositions of this invention are those which in aqueous solution provide a pH of about 4.5 or less. Those acid polyphosphates providing such relatively low pH levels in aqueous solutions also exhibit high binding power for metal ions at said low pH. It is pointed out that binding power and pH level are a required combination in compositions of this invention since low pH levels are required for antimicrobial properties to remain. Should polyphosphates providing higher pH levels in aqueous solution be employed and larger amounts of acidulant be required, the sequestering ability of such higher pH polyphosphate is reduced.

There has been described novel combinations of ingredients which, in a single dip process, provide surprising by storage stable cut plant parts including the difficultly stored cut potato and apple. However, any number of cut plant parts may be treated by the process of this invention. Another advantage of the process of this invention is the fact that the single dipping operation may be carried out at room temperature. The above-noted advantage not only provides economy with respect to the amount of equipment required but also provides economy in the reduced amount of handling and cleaning of such equipment. Because the single dip process of this invention is carried out at room temperature, i.e., from about 20° C. to about 25° C., it is abundantly clear that the process now described is extremely simple and cost effective.

The above-described dry, particulate preservative compositions of this invention are summarized as follows wherein function and preferred choice of agent are provided along with a general range of concentrations.

TABLE 1

| Function | Agent | Concentration Range % |
|---|---|---|
| antioxidant | ascorbic acid | 8-20 |
| enzyme inhibitor | calcium chloride | 20-40 |
| acidulant | citric acid | 8-20 |
| metal ion chelant | SAPP | 20-40 |

The compositions of this invention are conveniently formed in dry particulate form combined with dry blending to assure that the mixture is uniform. Dipped solutions of this invention are formed by combining suitable water for such a dip operation with the desired amount of the dry blended composition of this invention. Depending upon the cut plant parts to be treated, the dip solution contains up to about 5% of the dry blended composition. Higher amounts may be employed but benefits of extended storage life of the cut plant parts are not proportional. Usually satisfactory results are obtained when the dipping solution contains about 3% of a composition of this invention.

The following listed plants have been found to be satisfactorily treated in accordance with this invention with decreasing concentrations of preservative solutions: Potatoes→pears→green peppers→apples→lettuce.

It is preferred that the various agents chosen to be combined to make compositions of this invention provide completely soluble mixtures at the temperature and concentration employed. However, to obtain complete solution the dipping solution may be warmed slightly to aid in the dissolution of the components of the compositions of this invention.

To obtain maximum storage time before cut plant parts begin to exhibit deterioration they are immersed in a dipping solution of this invention as soon after cutting as is practical. The dipping solution may be allowed to cool before actual dipping operations begin in those instances wherein the water is warmed to reduce the required time for complete dissolution to occur. While adequate results are achieved with as little as 3% concentration of the inventive compositions of this invention it has been found to be more important to extend the time of contact of the cut plant parts with the dipping solution. Usually the contact time employed is from about 10 to about 30 minutes depending upon the plant variety and storage objective. For example, the contact time or dipping time for potatoes is in the range of from about 15 to about 25 minutes to obtain maximum storage stability. Effective long storage stability for apples, green peppers or lettuce is achieved at much shorter dipping times which may be as short as 2 minutes. Simple testing with particular varieties of plants enables the determination of optimum dipping or contact time.

The amount of each component of the preservative composition of this invention to contact the cut plant part varies within certain boundary limitations. By dry blending a composition as described above the amount of each ingredient to contact the cut plant part is controlled by the concentration of blend in the dipping solution. Optimally the dipping solution contains the following amount of each preferred ingredient by weight.

| Function | Agent | Concentration Range % |
|---|---|---|
| antioxidant | ascorbic acid | .25–1 |
| enzyme inhibitor | calcium chloride | .50–2 |
| acidulant | citric acid | .25–1 |
| metal ion chelant | SAPP | .50–2 |

The agents may also be added directly to the dipping solution independently thereby providing an opportunity to achieve dissolution on an independent basis as each ingredient is added.

The following examples are included herein to illustrate preferred embodiments of this invention. All blends or dipping solutions are described as weight percent of each component.

EXAMPLES 1–4

Whole potatoes were mechanically peeled and the eyes removed in the usual commercial process. The whole potatoes were then dipped in the solutions described below and stored at 0° C.–2° C. in polyethylene bags, each bag containing about 20 potatoes. No attempt was made to exclude air but each bag was tightly tied off with wire immediately above the top of the contents. The peeled potatoes were dipped in the solutions described below for 10 minutes, drained and immediately bagged and stored. In some instances the water was warmed to achieve maximum solution then cooled to ambient room temperature for use in the dipping operation. Upon cooling a small amount of insoluble material was observed at the bottom of the mixing tank. Dry blends of ingredients were made and then added to water as indicated below. Failure is noted upon the appearance of decay to the extent of brown spotting or color on the surface of the potatoes.

| EXAMPLE | 1 | 2 | 3 | 4 |
|---|---|---|---|---|
| SAPP | 33.3 | 33.3 | 33.3 | 33.3 |
| fumaric acid | 16.7 | 16.7 | 16.7 | 16.7 |
| NaCl | 16.7 | 16.7 | | |
| CaCl$_2$.2H$_2$O | 16.7 | 16.7 | 33.3 | 33.3 |
| erythorbic acid | 16.7 | 16.7 | 16.7 | |
| ascorbic acid | | | | 16.7 |
| % conc. in dip | 3 | 2 | 3 | 3 |
| days to failure | 5 | 3 | 5 | 5 |

EXAMPLES 5–10

The procedure of Example 1 was repeated with the exception that the dip time was 20 minutes. The composition, concentrations and results are listed below. Some compositions, for purpose of comparison, do not include agents to perform all functions included in the compositions of this invention.

| EXAMPLE | 5 | 6 | 7 | 8 | 9 | 10 |
|---|---|---|---|---|---|---|
| SAPP | 33.3 | 33.3 | 33.3 | 33.3 | 29.2 | 29.2 |
| fumaric acid | 16.7 | 16.7 | 16.7 | 16.7 | | |
| CaCl$_2$.2H$_2$O | 33.3 | 33.3 | 33.3 | | | |
| NaCl | | | | 33.3 | 33.3 | 33.3 |
| ascorbic acid | 16.7 | | 16.7 | 16.7 | 37.5 | 37.5 |
| erythorbic acid | | 16.7 | | | | |
| % conc. in dip | 3 | 4 | 3 | 4 | 3 | 4 |
| days to failure | 5 | 5 | 5 | 5 | 3 | 3 |

EXAMPLES 11–13

Apples (one each of Red Delicious, Golden Delicious, and Granny Smith) were quartered and placed in a pan at room temperature. Oxidation began at 10 minutes and in about 30 minutes the sliced areas turned uniformly brown. Another set of apples of the same varieties was quartered and submerged in aqueous solutions described below for a period of 2 minutes. After removal from the solution the sliced apples were placed in polyethylene bags (1 apple per bag). As much air as possible was pressed out of the bags and each bag tied tightly above the contents. In this example each component of the dipping solution was added individually to water to form the solution. No insoluble material was observed in the dipping solution.

Bananas were also tested in this example and a small amount of brown flecks appeared on the outside portion (adjacent peel) after 1 day on bananas treated with compositions of Examples 11 and 12. The bananas treated with the compositions of Example 13 were nearly completely covered on the outside portion (adjacent peel) with brown flecks after 1 day and considered unusable.

| | 11 | 12 | 13 |
|---|---|---|---|
| SAPP | 1 | 1 | |
| CaCl$_2$.2H$_2$O | 1 | 1 | |
| erythorbic acid | .5 | .5 | |
| citric acid | 1 | .5 | |
| ascorbic acid | | | 3 |

The Red Delicious variety dipped in the composition of Example 13 showed brown color along the peel line and at the seeds after 1 day and all varieties dipped in this composition showed mold formation after 5 days. The apples treated by dipping in compositions of Examples 11 and 12 dried out (8 days) without any color or mold deterioration observed.

EXAMPLES 14–15

Potatoes which were harvested the previous Fall and held in cold storage for about 6 months were mechanically peeled and the eyes removed in the usual commercial process. The whole potatoes were then dipped into the solutions described below for 20 minutes and placed in plastic bags for storage as described for Examples 1–4. The dipping solutions were prepared by first making a blend of materials and adding the specified amount of the blend to warm water to provide a 3 percent solution. The solutions were cooled to room temperature before the dipping operation began. The blend of Example 14 was completely soluble at the dipping temperature while the blend of Example 15 had a small amount of insoluble material at the dipping temperature.

| | 14 | 15 |
|---|---|---|
| SAPP | 33.3 | 33.3 |
| ascorbic acid | 33.3 | 33.3 |
| erythorbic acid | | 16.7 |
| citric acid | 16.7 | 16.7 |

After 5 days the potatoes dipped in the composition of Example 14 were superior to the potatoes dipped in composition Example 15. The first indication of color in the potatoes treated with the composition of Example 14 occurred on the 9th day and was attributed to a bruise on one corner of one potato. Also, a darkening at a bruised spot inherent in one potato was observed. This indicates that, contrary to sulfite treatment, damaged portions are not bleached to remove discoloration by compositions of this invention.

The above examples illustrate the importance of the combination of ingredients in the compositions of this invention. Although some alternative agents can be employed, the four functions of the dipping operation must be accomplished to provide the maximum storage time for the fruits and vegetables.

The results shown in the above examples demonstrate the importance of completely soluble preservative compositions in accordance with this invention. Compositions of this invention provide a combination or weight ratio of ingredients which provide the critical properties required to achieve extended storage life of freshly cut plant parts. The compositions of this invention are in completely soluble form in aqueous solution at ambient or room temperature. Such superior storage life of freshly cut plant parts has been demonstrated by the above examples over preservative compositions containing the same ingredients at different weight ratios which results in the insolubility of some components even to only a small degree. It has been found that the insolubility demonstrated in the above examples results from undesired interaction between the components of the preservative composition in aqueous solution. Such interaction results in one of the acids forming an insoluble salt at the concentrations and pH required for effective maximum storage life. Compositions of this invention have been designed to avoid conditions which result in undesired precipitation of any component in aqueous solution at acceptable dipping temperature.

Although the invention has been described by the above examples, such examples have been chosen to illustrate rather than limit the scope of the invention as defined by the following claims.

I claim:

1. A process for treatment of freshly cut plant parts which comprises dipping the plant parts in an aqueous solution at ambient temperature, said solution consisting essentially of:
   (a) from about 0.25% to about 1% of an antioxidant;
   (b) from about 0.5% to about 2% of a metal sequestrant comprising an alkali metal acid polyphosphate salt;
   (c) from about 0.25% to about 1% of an acidulant to provide a pH of below about 4.5; and
   (d) from about 0.5% to about 2% of an inorganic chloride enzyme inhibitor whereby the storage life of the parts is substantially extended.

2. Process of claim 1 wherein the acidulant is selected from the group consisting of fumaric acid, and citric acid.

3. Process of claim 1 wherein the metal sequestrant is sodium acid pyrophosphate.

4. A process of claim 1 wherein the antioxidant is selected from the group consisting of ascorbic acid or erythorbic acid.

5. A process of claim 1 wherein the enzyme inhibitor is selected from the group consisting of alkali metal and alkaline earth metal chlorides.

6. A process of claim 5 wherein the alkaline earth metal chloride is calcium chloride.

7. A process of claim 1 wherein the plant part is selected from potatoes, apples, green peppers, pears, and lettuce.

8. A process for the treatment of freshly cut potatoes which comprises dipping the freshly cut potato in an aqueous solution at ambient temperature, said solution consisting essentially of:
   (a) from about 0.5% to about 0.7% of ascorbic acid;
   (b) from about 0.5% to about 0.7% of citric acid to provide a pH of below about 4.5;
   (c) from about 1% to about 1.5% of sodium acid pyrophosphate; and
   (d) from about 1% to about 1.5% of calcium chloride whereby the storage life of the potato is substantially extended.

9. A process of claim 8 wherein the potatoes are peeled.

10. A process for the treatment of freshly cut apples which comprises dipping the freshly cut apples into an aqueous solution at ambient temperature, said solution consisting essentially of:
    (a) from about 0.2% to about 0.5% of ascorbic acid;
    (b) from about 0.2% to about 0.5% of citric acid to provide a pH of below about 4.5;
    (c) from about 0.3% to about 0.1% of sodium acid pyrophosphate; and
    (d) from about 0.3% to about 1% of calcium chloride whereby the storage life of the apples is substantially extended.

11. A process of claim 10 wherein the apples are sliced.

* * * * *

UNITED STATES PATENT AND TRADEMARK OFFICE
CERTIFICATE OF CORRECTION

PATENT NO. : 5,055,313

DATED : October 8, 1991

INVENTOR(S) : Beth Z. Warren

It is certified that error appears in the above-identified patent and that said Letters Patent is hereby corrected as shown below:

In Column 6, after line 59 insert a new line to read
--$CaCl_2 \cdot 2H_2O$      33.3      33.3--.

In Column 6, line 60, after the word "acid" in Example 14 delete "33.3" and insert therefor --16.7--, and in Example 15 delete --33.3--.

Signed and Sealed this

Second Day of February, 1993

Attest:

STEPHEN G. KUNIN

Attesting Officer

Acting Commissioner of Patents and Trademarks